United States Patent [19]

Yamaguchi

[11] 4,456,239
[45] Jun. 26, 1984

[54] SHEET MATERIAL FEEDING APPARATUS
[75] Inventor: Toshimitsu Yamaguchi, Minami-ashigara, Japan
[73] Assignee: Fuji Photo Film Co., Ltd., Kanagawa, Japan
[21] Appl. No.: 405,607
[22] Filed: Aug. 5, 1982
[30] Foreign Application Priority Data
Aug. 7, 1981 [JP] Japan .................................. 56-123754
Oct. 23, 1981 [JP] Japan .................................. 56-169601
[51] Int. Cl.³ .......................... B65H 5/22; B41J 11/58
[52] U.S. Cl. .................................... 271/3.1; 400/624; 271/12; 271/189
[58] Field of Search .................... 271/3.1, 3–5, 271/10–17, 189, 218, 158–159; 414/37, 45; 400/624, 625, 626, 627, 628, 629
[56] References Cited
U.S. PATENT DOCUMENTS
3,418,895 12/1968 Palmer .............................. 414/45 X
3,591,018 7/1971 Nalbach ............................... 414/37
4,050,687 9/1977 Spence-Bate ....................... 271/3.1

Primary Examiner—Bruce H. Stoner, Jr.
Assistant Examiner—Lisa M. Rosenberg
Attorney, Agent, or Firm—Gerald J. Ferguson, Jr.; Joseph J. Baker

[57] ABSTRACT

A sheet material feeding apparatus has a circulating support board for carrying sheets from a sheet receiving station to a sheet delivering station. The apparatus consists of at least one support board and a first inclined board at the receiving station for supporting the sheets as tilted from the vertical in the order of supply with the first supplied sheet at the bottom, a second inclined board at the delivering station for supporting the sheets as tilted in the opposite direction from the vertical with the order of the sheets being upside down from that at the receiving station, and structure for moving the support board so as to follow a circulatory path starting from and returning to the receiving station via the delivering station. The sheets can be delivered one by one in the order of supply to the receiving station with no rubbing and resultant scratching of the surfaces of the sheets.

3 Claims, 11 Drawing Figures

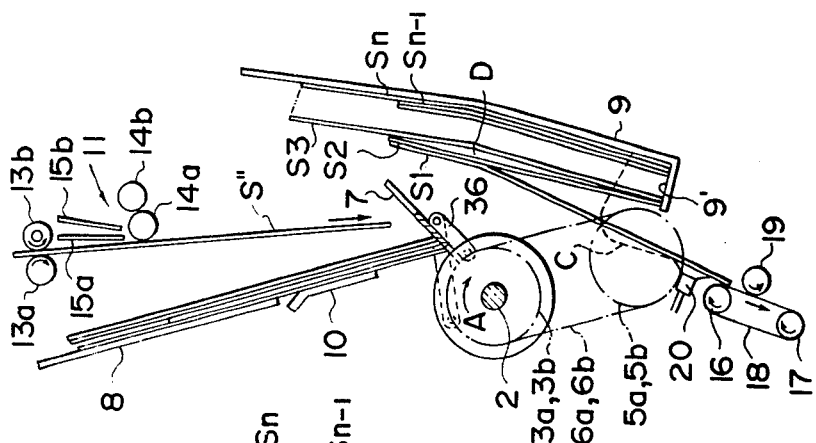
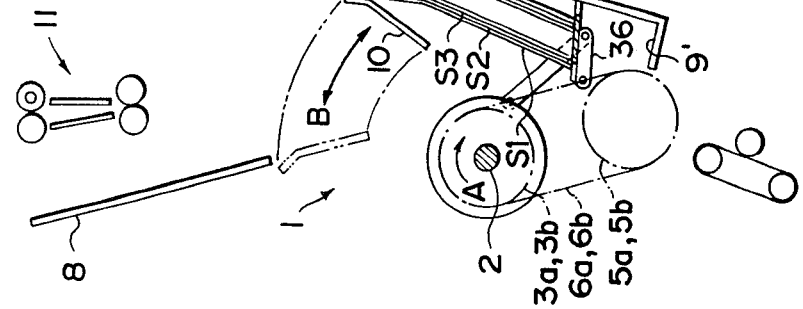
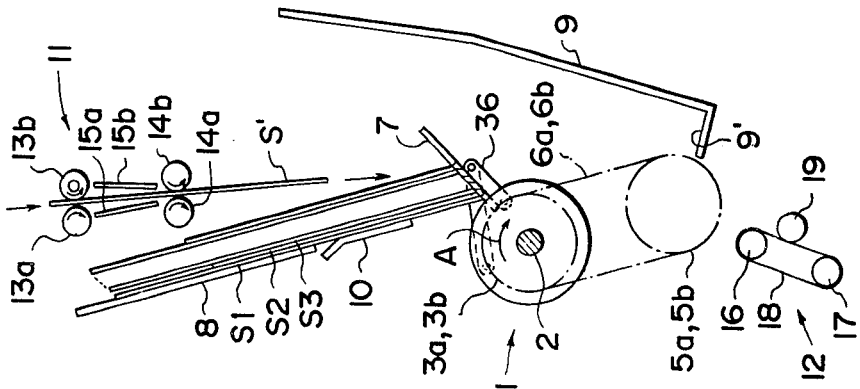

F I G. 3A
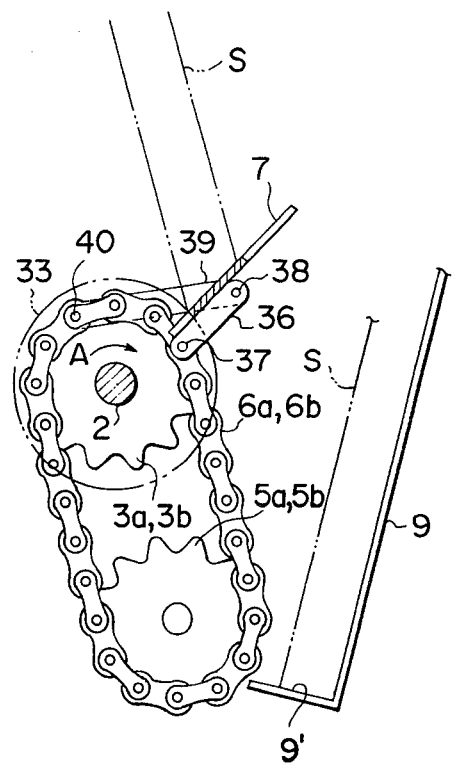
F I G. 3B
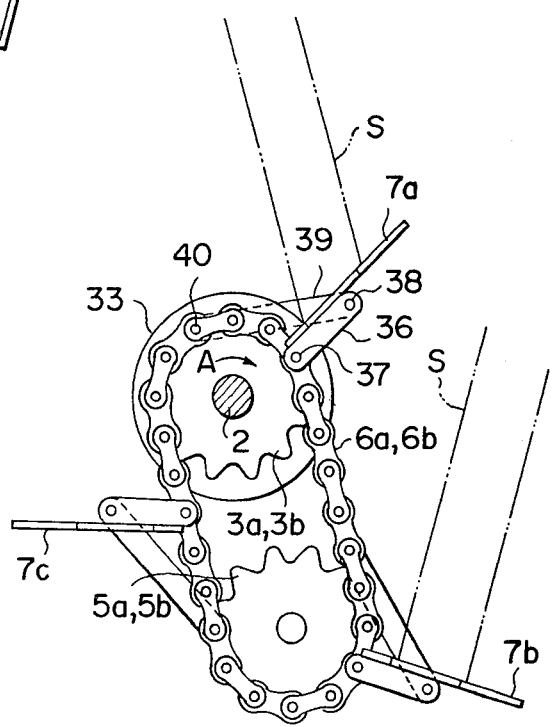

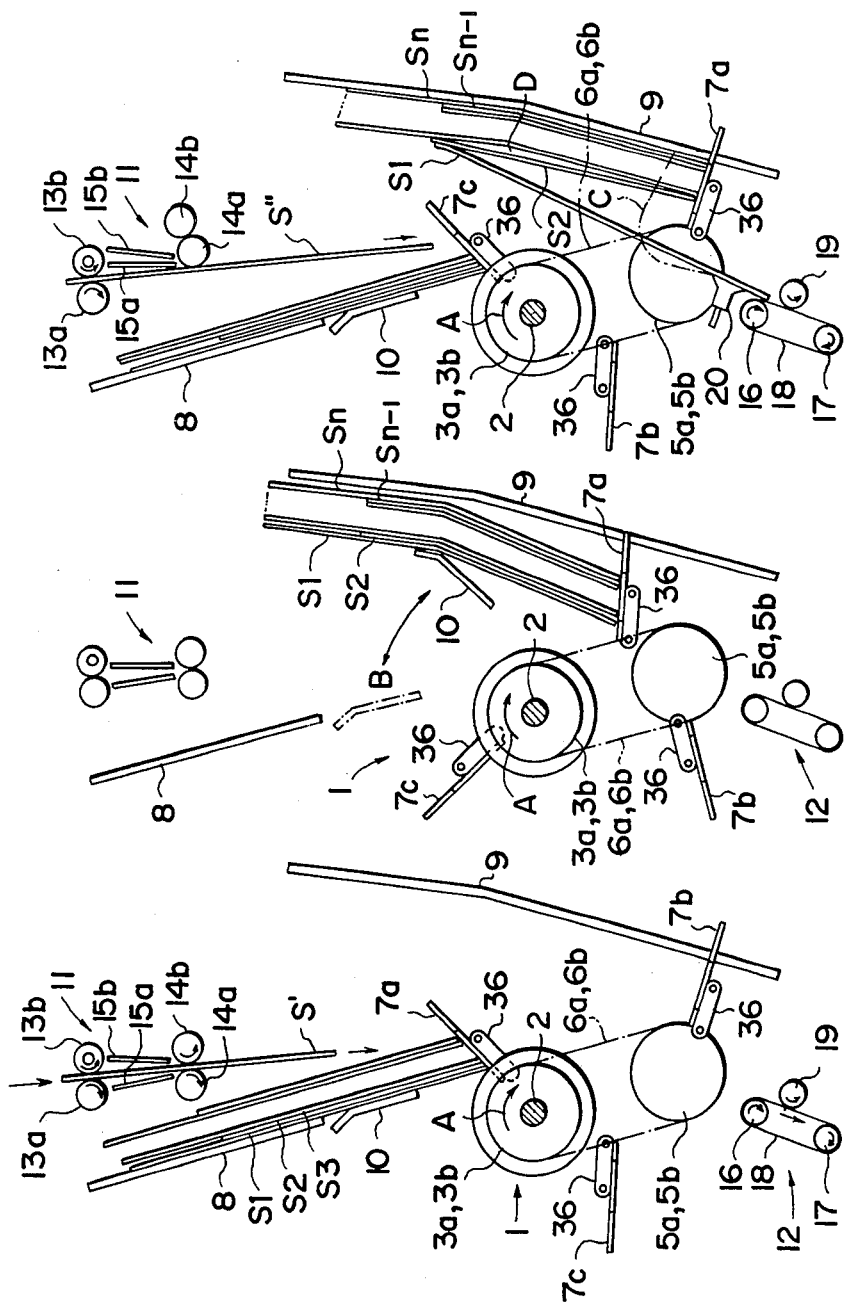

F I G. 5A
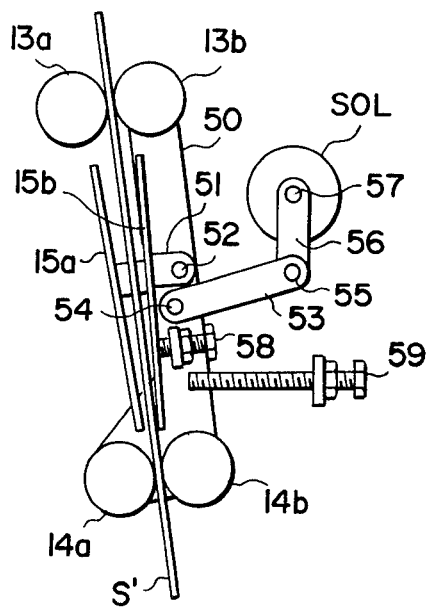
F I G. 5B
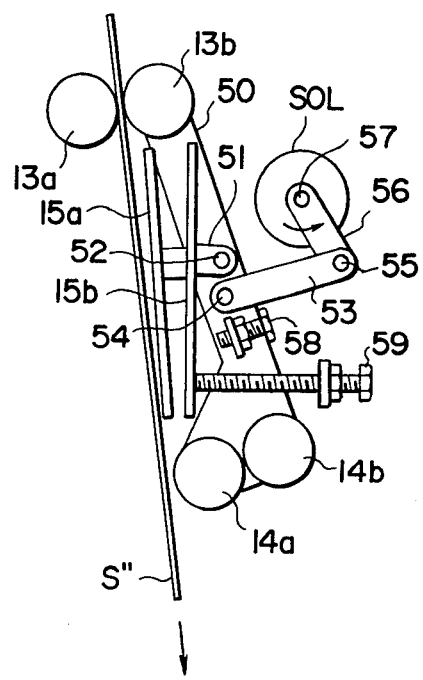

SHEET MATERIAL FEEDING APPARATUS

BACKGROUND OF THE INVENTION

1. Field of the Invention

This invention relates to a sheet material feeding apparatus in which a plurality of sheets are supplied one by one to a sheet receiving station at regular or irregular intervals, and then the sheets are brought to a sheet sending station where they are stacked to be ready for dispatch one after another.

2. Description of the Prior Art

There has been hitherto known a radiation image read-out apparatus such as an X-ray image read-out apparatus, in which a stimulable phosphor sheet bearing an X-ray image or picture of a human body or any other object is subjected to the sweeping of a laser beam and is stimulated by the laser beam to emit light according to the recorded radiation image and the emitted light is detected by a photodetector thereby obtaining an image signal which represents the X-ray image or picture. A laser beam modulated with the image signal is projected onto a photosensitive film recording medium to make a record of the X-ray image or picture. Stimulable phosphor sheets capable of storing X-ray pictures are usually used and the phoshpor sheets each bearing an X-ray picture thereon are brought to a sheet-feeding station of the X-ray image read-out apparatus manually or by a conveyor means, and the phosphor sheets are automatically brought to a recording station one after another. In most cases, X-ray photographs are not taken at regular intervals, and this is particularly true in the case of medical diagnosis. Because of this, no direct conveyor means is provided between the X-ray image pick-up apparatus and the associated X-ray image read-out apparatus. Instead, the phosphor sheets are intermittently supplied one by one and are temporarily stored and stacked in the sheet receiving station of the X-ray image read-out apparatus. Then, the stack of sheets at the sheet receiving station is brought to the sheet sending station for delivery one by one to the recording station of the X-ray image read-out apparatus. The so-constructed sheet conveyor system of the X-ray image recording apparatus permits the X-ray image read-out apparatus to operate independently of the timing and rate at which the phosphor sheets are supplied from the X-ray image pick-up apparatus, thus increasing the efficiency of operation. Because of the independent operation of the X-ray image read-out apparatus, there arises no need to interrupt the taking of X-ray pictures even if the X-ray image read-out apparatus should break down or malfunction, or if phosphor sheets should be supplied from the X-ray image pick-up apparatus at a rate beyond the working capability of the X-ray image read-out apparatus.

In one conventional sheet feeding apparatus of this type in which sheets are brought from a sheet receiving-and-storing station to a sheet-by-sheet sending station, a number of sheets are stacked on each other, and these sheets are later picked up one by one beginning from the lowermost to be sent to the subsequent station. In another conventional sheet feeding apparatus, sheets are sequentially put in individual compartments and the sheet inlet and sheet outlet of each of the compartments are opened and closed by, for instance, a link mechanism in a way appropriate for storing and delivering the sheets one after another, thus causing the sheets to sequentially fall in and out of the compartments under their own weight. In the former conventional apparatus which picks up the sheets one by one beginning from the lowermost, it is difficult to assure the separation of a single sheet without bringing along the overlying sheet in the stack of sheets. Another problem is that when the sheet is drawn from the bottom of the stack, it is apt to be scratched by rubbing against the sheet above and the supporting surface below. This is a serious problem in an X-ray image read-out apparatus in which sheets being handled are phosphor sheets. Also, in the latter conventional apparatus the overall size of the apparatus increases with the amount of the sheet material to be handled, and the structure of the apparatus becomes complicated. Also disadvantageously, if a sheet is bent at any part, it is apt to catch as it falls through the inner space of the compartment. Another problem common to these conventional sheet feeding apparatuses is that it is difficult to handle sheet materials of different sizes when they are mixed irregularly.

SUMMARY OF THE INVENTION

The object of this invention is to provide a sheet material feeding apparatus of relatively simple structure which protects the sheets fed thereby from rubbing and scratching, permits the delivery of sheet materials one after another in the order of reception, allows the simultaneous handling of sheets of different size, makes it possible to store a large number of sheets, and prevents jamming of the apparatus with the sheets.

In a sheet material feeding apparatus of the type in which a plurality of sheets are supplied to a sheet receiving station at regular or irregular intervals and in which these sheets are brought from the sheet receiving station to a sheet-by-sheet delivering station, the improvement according to this invention comprises: a support board for holding the plurality of sheets substantially vertically; a first inclined board against which the sheets lean in the order of their supply with the first supplied sheet nearest the first inclined board, said first inclined board being positioned at said receiving station; a second inclined board against which the sheets lean in the order of their supply with the first supplied sheet farthest from the second inclined board, said second inclined board being positioned at said sheet delivering station; and means for circulating said support board between said sheet receiving station and said sheet delivering station.

In another improvement according to this invention, the sheet material feed apparatus comprises a plurality of support boards each capable of holding a plurality of sheets substantially vertically; a first inclined board against which the sheets lean in the order of their supply with the first supplied sheet nearest the first inclined board, said first inclined board being positioned at said sheet receiving station; a second inclined board against which the sheets lean in the order of their supply with the first supplied sheet farthest from the second inclined board, said second inclined board being positioned at said sheet delivering station; means for circulating said support boards between said sheet receiving station and said sheet delivering station; and inclination switching means for tilting each of said support boards toward said first inclined board at said sheet receiving position and toward said second inclined board at said sheet delivering station.

With these arrangements sheet materials can be held substantially vertically at all times and therefore a large number of sheets can be stored and handled. Also, advantageously the vertical orientation of the sheets makes it possible to handle sheets of different sizes at the same time. When a stack of sheets is shifted from the sheet receiving station to the sheet delivering station, the stack of sheets is turned upside down, and therefore when the sheets are picked up one by one beginning from the uppermost, they can be delivered in the order of their supply to the sheet receiving station. The sheets are, moreover, protected from rubbing and scratching. The sheet material feeding apparatus according to this invention is most suitable for use in bringing phosphor sheets from an X-ray image pick-up apparatus to an associated X-ray image read-out apparatus. Advantageously, the sheet feeding apparatus according to this invention can be used where sheets are supplied at regular or irregular intervals, are temporarily stored, and are then brought to a sheet delivering station at which the sheets thus brought are put in condition for delivering one by one in the order of initial reception without causing any scratches on the surface of the sheets. For instance, a sheet material feeding apparatus according to this invention can be applied to an automatic machine in which sheets after first printed or labeled, are then temporarily stored, and are then brought to a wrapping station. Also advantageously, a sheet material feeding apparatus according to this invention can be applied to a printing or copying machine in which sheets are subjected to two or more printing or copying processes. In this case, the sheet material feeding apparatus temporarily stores the sheets after they have been subjected to a first printing or copying process and the apparatus then delivers these sheets one by one to a subsequent printing or copying station. Still another possible application is in a medical appliance in which X-ray films bearing latent images are temporarily stored before sending to a developing station.

The objects and advantages of this invention will be better understood from the following description of preferred embodiments.

BRIEF DESCRIPTION OF THE DRAWINGS

FIGS. 1A–1C show a first embodiment according to this invention in sequential positions of operation, FIG. 3A shows the drive part of the sheet feeding apparatus of FIGS. 1A–1C in an enlarged scale, FIG. 3B is a view similar to FIG. 3A, which shows a part of the apparatus of FIGS. 4A–4C, FIG. 4A–4C shows a second embodiment according to this invention in sequential positions of operation, and FIGS. 5A and 5B show a sheet supplying unit in two different positions in an enlarged scale.

DESCRIPTION OF THE PREFERRED EMBODIMENT

Figure 2:
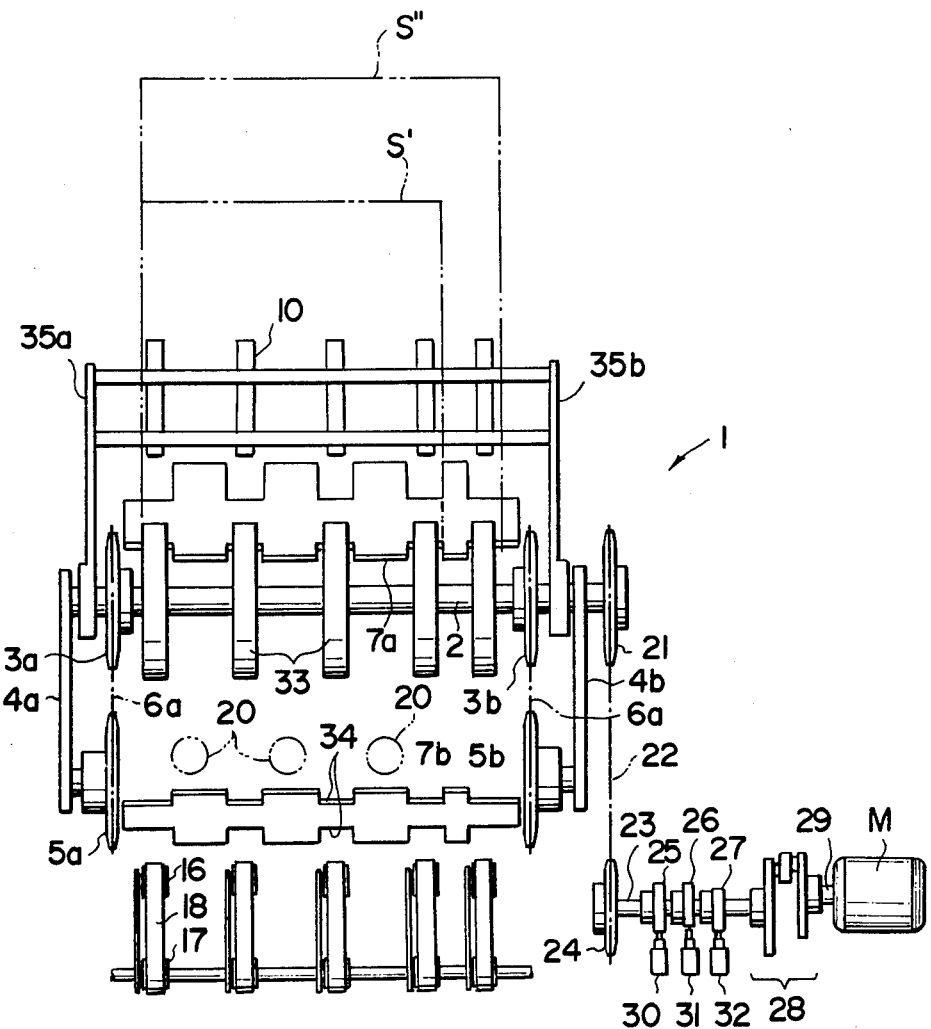
FIG. 2 shows a front view of the sheet feeding apparatus as shown in FIG. 1.

Referring to FIGS. 1A to 1C, there is shown a sheet material feeding apparatus according to this invention in sequential positions of operation. FIG. 2 shows a front view of the sheet material feeding apparatus. As shown, the sheet material feeding apparatus 1 comprises an axle 2; two pairs of sprocket wheels 3a, 5a and 3b, 5b, sprocket wheels 3a and 3b being fixed to the opposite ends of the axle 2 and sprocket wheels 5a and 5b being fixed to rods 4a, 4b; two endless drive chains 6a, 6b trained on the pairs of sprocket wheels 3a, 5a and 3b, 5b, respectively; a support board 7 connected to the endless drive chains 6a, 6b; a first inclined board 8 positioned above the sprocket wheels 3a, 3b in parallel relationship with the endless drive chains; a second inclined board 9 adjacent to the sprocket wheels 5a, 5b, slanting symmetrical to the first inclined board with respect to the vertical and having an inner extension integrally connected to the bottom end thereof to form a sheet support 9'; and a sheet shifting member 10 movable between the first inclined board 8 and the second inclined board 9 in the direction as indicated by arrow "B" in FIG. 1B. The sheet material feeding apparatus 1 is positioned below an associated sheet supplying unit 11 and above an associated sheet delivering unit 12. As mentioned earlier, the sheet material feeding apparatus according to this invention can be used to bring phosphor sheets from an X-ray image pick-up apparatus to an X-ray image read-out apparatus. In such case phosphor sheets S are supplied one by one to the sheet feeding apparatus by a sheet supplying unit 11 including a pair of upper pinch rolls 13a, 13b, two convergent guide plates 15a, 15b and a pair of lower pinch rolls 14a, 14b. The upper and lower pinch rolls are rotated as indicated by arrows so as to pass the phosphor sheets S downward. The sheet delivering unit 12 includes two sets of wheels 16 and 17, endless belts 18 trained on these wheels, rollers 19 pushed against the belts and suction pads 20. The sheet delivery unit 12 consists of five stages. The sheet delivering unit 12 is driven in the direction as indicated by arrows in FIG. 1C, thereby passing the phosphor sheet downward. The suction pads 20 are connected to a vacuum pump (not shown) so as to be able to catch a relatively light object by the air drawn therethrough. The suction pads 20 are movable along a curved path C as shown by a broken line in FIG. 1C. Now, the driving part of the sheet feeding apparatus 1 will be described with reference to FIG. 2. As shown, a sprocket wheel 21 is fixed to one end of the main axle 2 and is connected to a sprocket wheel 24 by an endless drive chain 22. The sprocket wheel 24 is fixed to a driving axle 23 having three cams 25, 26 and 27 which, in association with limit switches 30, 31 and 32, are used for detecting different positions of the support board 7. The other end of the driving axle 23 is connected to a motor "M" through a crank 28. The three limit switches 30, 31 and 32 are positioned in alignment with the position detecting cams 25, 26 and 27 respectively. Five sheet contact rings 33 are fixed to the main axle 2 between the two sprocket wheels 3a and 3b. The sheet support board 7 has five recesses 34 on either side of the board. The five sheet contact rings 33 extend into the five recesses 34 on the inner side of the support board 7, while the five endless drive belts 18 of the sheet delivering unit 12 extend into the five recesses 34 of the outer side of the support board 7. Thus, the support board 7 can pass by the sheet contact rings 33 and the endless drive belts 18 without being caught thereby in the course of its passage around the sprockets. The sheet shifting member 10 comprises five strips connected to two parallel crossrods, which, in turn, are connected to opposing arms 35a and 35b rotatably fixed to the main axle 2. The side-recessed support board 7 passes the shifting member 10 without being caught thereby. The second inclined board 9 is comprised of five strips in alignment with the recesses 34 on the outer side of the support board 7, and therefore, the support board 7 when traveling, is not caught by the second inclined board 9. FIG. 3A shows the mode in which the support board 7 is fixed to the endless drive chains 6a, 6b. As shown, the support board 7 is connected to the endless drive chains 6a and 6b through relatively short arms 36, which are fixed to the endless drive chains 6a and 6b. Specifically, one end of each arm 36 is connected to the endless drive chain by means of a pin 37, and a relatively long arm 39 is connected to the other end of the relatively short arm 36 by means of a pin 38. The end of the longer arm 39 opposite to that joined with the shorter arm 36, is connected to the endless drive chain by means of a pin 40.

The operation of the sheet feeding apparatus 1 is described hereinbelow. The endless drive chains 6a and 6b are assumed to stop when the support board 7 is in the position shown in FIG. 1A. The endless drive chains 6a and 6b stop every time they have completed one revolution. When the sheet feeding apparatus is in the position as shown in FIG. 1A, the endless drive chains 6a and 6b begin to run, causing the support board 7 to make one revolution along the loop of the endless drive chains before returning to the original position. The endless drive chains are controlled through the agency of the position detecting cam 27 and the associated limit switch 32. In FIG. 1A, the phosphor sheet S passes through the pinch rolls 14a, 14b of the sheet supplying unit 11 and then falls on the support board 7 under its own weight. As shown, the support board 7 is inclined with its outer edge upward. The sheet S slides along the inclined surface of the support board 7 from the right to left and comes to lean against the earlier fed sheets S1, S2, S3 ... already resting on the first inclined board 8 and the sheet shifting member 10, both of which are inclined to the left. The lower part of the sheet S is brought in contact with the sheet contact rings 33. The sheets fall one by one from the sheet supplying unit 11 onto the first inclined board 8 and the support board 7, whereby these phosphor sheets are laid on each other in the order of supply. When a predetermined number of phosphor sheets have accumulated on the support board 7 and when it is detected that no phosphor sheet remains at the sheet delivering station, the motor "M" starts rotation and the endless drive chains 6a, 6b start running. As a result, the support board 7 makes a full revolution starting from and returning to the sheet receiving station. In the course of this full revolution it passes through the sheet delivering station and in particular passes by the sheet support 9' at the bottom end of the second inclined board 9. At the same time the sheet shifting member 10, which together with the first inclined board 8 has up to now supported "n" phosphor sheets, moves away from the stationary first inclined board 8, and advances clockwise as indicated by arrow "B" in FIG. 1B. Thus, the phospor sheets S1, S2 ... Sn are brought to the second inclined board 9 to lean against it. When the support board 7 has made a full revolution, passing by the sheet support 9' of the second inclined board 9 and returning to the original position, the endless drive chains 6a and 6b stop (FIG. 1C). The number of phosphor sheets on the support board 7 can be counted and the fact that no phosphor sheets are resting on the sheet support 9' of the second inclined board 9 can be detected by conventional means well known to those skilled in the art. Also, the swing of the sheet shifting member 10 can be performed by swinging the arms 35a and 35b about the main axle 2 using a conventional means (not shown). Immediately after "n" phosphor sheets have been pushed against the second inclined board 9, the sheet shifting member 10 returns to the original position in which it is in alignment with the first inclined board 8.

The sheet shifting member 10 used in this particular embodiment is not absolutely necessary. The first inclined board 8, the second inclined board 9 and the endless drive chains 6a, 6b carrying the support board 7 can be arranged so as to cause the same effect as the sheet shifting member 10. Also, the sheet contact rings 33 can be modified to cause the same effect as the sheet shifting member 10.

In the position as shown in FIG. 1C, "n" phosphor sheets S1, S2 ... Sn lean against the second inclined board 9 and stand on the sheet support 9' of the second inclined board 9 and are, thus ready to leave the sheet feeding apparatus with the aid of the sheet delivering unit 12. As shown in FIG. 1C, the "n"th phosphor sheet Sn rests on the second inclined board 9, and the "n−1"th phosphor sheet Sn−1 lies on the "n"th phosphor sheet, and the remaining phosphor sheets lie sequentially on each other in the order of Sn-2, Sn-3, Sn-4 ... S2 and S1. The so-stacked phosphor sheets S1, S2 ... Sn are picked up sequentially in the order named by the suction pads 20 which move along the path indicated by broken line C in FIG. 1C. Thus, the phosphor sheets are brought from the second inclined board 9 to the sheet delivering unit 12 in the same order as the phosphor sheets were supplied onto the first inclined board 8 and the support board 7 by the sheet supplying unit 11. Then, the phosphor sheets are caught one after another by the endless drive belt 18 and the rollers 19 and are passed downward to the X-ray image read-out apparatus (not shown). On the other hand, the support board 7 has now returned to the same position as shown in FIG. 1A, and therefore is in a condition ready to receive phosphor sheets S. Thus, even when phosphor sheets are being removed from the second inclined board, new phosphor sheets can be supplied from the sheet supplying unit 11 onto the support board 7. Thus, the sheet feeding apparatus according to this invention permits the supplying thereto of phosphor sheets S from the X-ray image pick-up apparatus independently from the operation of delivering phosphor sheets to the X-ray image read-out apparatus. Stated otherwise, the use of the sheet material feeding apparatus according to this invention permits the running of the X-ray image read-out apparatus at its own working rate irrespective of the rate at which phosphor sheets are supplied from the X-ray image pick-up apparatus. As the use of the sheet feeding apparatus according to this invention obviates the necessity of coordinating the discharging of sheets from the X-ray image pick-up apparatus and the supplying of sheets to the X-ray image read-out apparatus, the phosphor sheets S can be supplied from the sheet supplying unit 11 so far as the support board 7 is moving. In this connection it is better for the support board 7 to move at the maximum possible speed. However, if the support board 7 stops or starts too quickly, the phosphor sheets may be badly disturbed and the support board is likely to overrun the right position. Therefore, it is best to start and stop the support board 7 as slowly as possible and to increase its speed during the intermediate portion of its running cycle. For the purpose of controlling the acceleration and deceleration of the support board 7 there is provided a crank mechanism 28 between the motor "M" and the drive axle 23 for rotating the drive axle 23 at a controlled speed. A Geneva drive, planetary gears, solid cams and other link mechanisms can be used to move the support board 7 at a controlled speed as desired. The position detecting cam 26 and the associated limit switch 31 are used to determine the time at which the sheet shifting member 10 starts moving, whereas the position detecting cam 25 and the associated limit switch 30 are provided to prevent damage to the apparatus or the phosphor sheets due to the overrunning of the support board 7, which might be caused, for instance, by the failure of the limit switch 32. The second inclined board 9 is somewhat bent for the purpose of preventing the uppermost phosphor sheet from being accompanied by the underlying one in removing and delivering the uppermost one. Specifically, if the second inclined board 9 against which phosphor sheets lean is somewhat bent, there appears a space D between the phosphor sheets (See FIG. 1C), thereby preventing the phosphor sheets from sticking to each other.

As is readily understood from the above, in the sheet material feeding apparatus according to this invention phosphor sheets are never rubbed with each other, with the first and second inclined boards 8, 9, or with the sheet shifting member 10, and therefore no scratches appear on the phosphor sheets. In removing and delivering phosphor sheets from the stack of phosphor sheets at the sheet delivering station the uppermost one is picked up, and there is little or no possibility of the uppermost sheet being accompanied by the underlying one. On the other hand, if the lowermost one were to be pulled out from the stack of phosphor sheets, the sheet above would often be pulled out together with the underlying and lowermost sheet. The phosphor sheets stand on the support board 7 at the least receiving station, and they stand on the sheet support 9' of the second inclined board 9 at the sheet delivering station. Therefore, phosphor sheets of different sizes can be mixed and handled with case. In mixing and handling phosphor sheets of different sizes it is necessary to arrange those phosphor sheets S' and S'' with their one longitudinal sides in alignment with each other as shown in FIG. 2, and it is also necessary to put the suction pads 20 within the transverse range of the width of the smaller phosphor sheets, thereby permitting the suction pads 20 to pick up all sizes of phosphor sheets being handled.

This particular embodiment is so constructed that after a predetermined number of phosphor sheets have been placed on the first inclined board, the support board 7 moves and brings the phosphor sheets to the sheet delivering station. The sheet material feeding apparatus can be so modified that immediately after a single phosphor sheet S is supplied to stand on the support board 7, the support board 7 starts to bring the phosphor sheet S to the sheet delivering station. More specifically, when the first phosphor sheet S1 is supplied to the support board 7, and when no phosphor sheet stands on the sheet support 9' of the second inclined board 9, the support board 7 immediately begins to bring the phosphor sheet S1 to the sheet delivering station, and the support board 7 returns to the starting position, leaving the first phosphor sheet S1 behind at the sheet delivering station. Then, the suction pads 20 are in responsive for instance, to a control signal from the X-ray image pick-up apparatus, operated to pick up and remove the first phosphor sheet S1 from the second inclined board. When the subsequent and second phosphor sheet S2 is supplied to the sheet receiving station, and when the precedent and first phosphor sheet S1 has been removed from the sheet delivering station, the support board 7 bearing the second phosphor sheet S2 thereon moves to the sheet delivering station to put the second phosphor sheet S2 there. The third and subsequent phosphor sheets S3, S4, . . . are similarly brought one after another to the sheet delivering station after the preceding phosphor sheet has been removed therefrom. When it happens that phosphor sheets are supplied to the sheet receiving station more quickly than the phosphor sheets are dispatched from the sheet delivering station, a plurality of phosphor sheets come to be stored at the sheet receiving station because the support board 7 cannot move until the sheet delivering station is empty. When the phosphor sheets have been discharged from the sheet delivering station, the support board 7 bearing the plurality of phosphor sheets move to the sheet delivering station. Thus the support board 7 carries an increasingly large number of phosphor sheets to the sheet delivering station at maximum possible efficiency.

Referring to FIGS. 3B, 4A, 4B and 4C, there is shown another embodiment according to this invention. In these drawings the same parts and units as those of the first embodiment in FIGS. 1A, 1B and 1C, are indicated by the same reference numerals. This second embodiment is different from the first embodiment only in that it has three support boards $7a$, $7b$ and $7c$ equispaced along the length of the endless drive belts $6a$ and $6b$ and that the second inclined board 9 has no sheet support 9'.

In operation the endless drive chains $6a$ and $6b$ stop with the support boards $7a$, $7b$ and $7c$ in the position as shown in FIG. 4A. The sprocket wheels $3a$ and $3b$ are made to stop every time they have rotated one third of a complete rotation. The first intermittent rotation causes the three support boards $7a$, $7b$ and $7c$ to advance to the positions which the support boards $7b$, $7c$ and $7a$ are shown as occupying in FIG. 4A. The endless drive chains $6a$ and $6b$ are controlled using the position detecting cam 27 and associated limit switch 32. In the position as shown in FIG. 4A, when the first phosphor sheet S1 leaves the sheet supplying unit 11, in particular the pinch rolls $14a$ and $14b$ thereof, the phosphor sheet S1 falls onto the support board $7a$. The lower side of the phosphor sheet slides along the inclined surface of the support board $7a$ and comes to lean against the first inclined board 8 and the sheet shifting member 10. At this time, the lower side of the first phosphor sheet S1 rests on the sheet contact rings 33. The second, third, fourth . . . phosphor sheets S2, S3, S4 . . . are supplied one after another onto the support board $7a$ and these subsequent phosphor sheets are laid on each other in the order of supply. When a predetermined number of phosphor sheets have been loaded onto the support board $7a$ and when it is detected that there are no phosphor sheets on the preceding support board $7b$, the motor "M" is energized to cause another intermittent advance of the endless drive chains $6a$ and $6b$, and hence the support boards $7a$, $7b$ and $7c$ associated therewith. Specifically, the support board $7a$ moves from the position at which the phosphor sheets have been received to the position at which the phosphor sheets are to be discharged (this latter position corresponding to the position of the support board $7b$ in FIG. 4A). At the same time the sheet shifting member 10 moves from the left to the right in the direction as indicated by arrow B. Thus, "n" phosphor sheets S1, S2, S3, . . . Sn are shifted from the first inclined board 8 to the second inclined board 9. When the support board $7a$ advances to the position of the support board 7b in FIG. 4A, the endless drive chains 6a and 6b are made to stop (See FIG. 4C). The number of the phosphor sheets can be counted by a conventional counting means and the detection as to whether any phosphor sheets rest on the support board at the sheet delivering station can be performed by a conventional means which is well known to those skilled in the art. The sheet shifting member 10 is returned to the starting position by rotating the arms 35a and 35b counterclockwise about the main shaft 2 immediately after it has been brought to the right extremity or terminal position. In its original position the sheet shifting member 10 is in alignment with the first inclined board 8. In the position as shown in FIG. 4C the support board 7a intersects the second inclined board 9, and the "n" phosphor sheets are laid against the second inclined board 9, standing on the support board 7a in condition to be passed to the sheet delivering unit 12. These "n" phosphor sheets S1, S2, S3 . . . Sn rest against the second inclined board 9 in the order named, the lowermost phosphor sheet being on the surface of the second inclined board 9. The so-stacked phosphor sheets are picked up and removed one by one by the suction pads 20, which move along the path indicated by broken line C. Thus, the phosphor sheets are carried by the suction pads one after another in the order of supply from the sheet supplying unit 11 and passed between the endless drive belts 18 and the rollers 19. Then, the phosphor sheets are discharged into the X-ray image read-out apparatus (not shown). When the support board 7a intersects the second inclined board 9 and supports a stack of phosphor sheets at the sheet delivering station, the next-following support board 7c is at the sheet receiving station where it, along with the first inclined board 8 and the sheet shifting member 10, is ready to receive phosphor sheets S, thus allowing the sheet supplying unit 11 to supply phosphor sheets onto the support board 7c one by one, irrespective of whether all the phosphor sheets have been removed from the support board 7a at the sheet delivering station. In this connection the sheet feeding apparatus according to the second embodiment permits the supply of phosphor sheets from an X-ray image pick-up apparatus independent from the delivery of phosphor sheets to an X-ray image read-out apparatus. The intermittent advance of the support boards 7a, 7b and 7c is preferably made as quickly as possible. It is, however, necessary to start and stop the boards as slowly as possible lest any disturbance of phosphor sheets may be caused or lest any overrun of the support boards be caused. Similar to the first embodiment, a crank mechanism 28 is provided between the motor M and the drive shaft 23 for the purpose of rotating the drive shaft 23 and hence driving the endless drive chains 22 and the support boards 7a, 7b and 7c at a controlled speed as required.

In handling phosphor sheets of different sizes it is necessary to reduce to the minimum possible the falling distance from the sheet supplying unit 11 to the support board at the sheet receiving station because otherwise, the phosphor sheets are likely to bounce and stick out from one side or the other of the support board. If the sheet supplying unit 11 is fixed in position, the falling distance is inversely proportional to the length of the phosphor sheets. Thus, it is preferable that the height of the sheet supporting unit 11 be made variable with the length of the phosphor sheets. The sheet feeding apparatus according to the second embodiment is so constructed that the falling distance can be reduced to the minimum for each of two different sizes of phosphor sheets S' and S".

In FIG. 4A the sheet feeding apparatus is shown handling a shorter phosphor sheet S'. As can be seen, the shorter phosphor sheet S' passes through the longitudinal space defined by the pinch rolls 13a, 13b, the guide plates 15a, 15b and the pinch rolls 14a, 14b. After leaving the lower pinch rolls 14a, 14b, the phosphor sheet S' falls onto the support board 7a. The sheet supplying unit 11 is of coursed fixed at a relatively low level to minimize the falling distance. In handling a longer phosphor sheet S", the guide plates 15a, 15b and the pinch rolls 14a, 14b are shifted to the right, as shown in FIG. 4C. Thus, after passing through the upper pinch rolls 13a, 13b, the longer phosphor sheet S" falls onto the support board 7c. If the upper pinch rolls 13a, 13b are located above the lower pinch rolls 14a, 14b by a distance equal to the difference in length between the longer phosphor sheet S' and the shorter phosphor sheet S", the longer phosphor sheet S' will fall on the support board 7c immediately after leaving the upper pinch rolls 13a and 13b. The sheet supplying unit 11 is shown in detail in FIGS. 5A and 5B. The pair of pinch rolls 14a, 14b are rotatably fixed between a pair of opposing arms 50, only one of which is shown. These arms 50 are adapted to swing about the axle of pinch roll 13b. A relatively short transverse arm 51 is rotatably fixed to the center of the arm 50 by a pin 52. The guide plates 15a, 15b are fixed to the transverse arm 51. Another transverse arm 53 is rotatably fixed at one end to the arm 50 by a pin 54 just below the transverse arm 51. One end of a rotatable arm 56 is rotatably fixed by a pin 55 to the end of the transverse arm 53 opposite to the end fixed to the arm 50. The other end of the rotatable arm 56 is fixed to the drive shaft 57 of a solenoid "SOL". A stopper screw 58 is fixed to the arm 50 just below the transverse arm 53 and another stopper screw 59 is provided just below the first stopper 58, independent of the arm 50. When a sheet size detecting device such as a photodiode (not shown) detects that a smaller phosphor sheet S' is being fed, the solenoid "SOL" puts the rotatable arm 56 in the position shown in FIG. 5A. The guide plates 15a, 15b which are spring-urged to rotate counterclockwise, are brought in contact with the stopper screw 58, at which time the space between the diverging ends of the guide plates 15a, 15b is just below the upper pinch rolls 13a, 13b whereas the space between the converging ends thereof is just above the lower pinch rolls 14a, 14b. When the sheet size detecting device detects that a larger phosphor sheet S" is being fed, the solenoid "SOL" rotates its drive shaft 57 counterclockwise to bring the rotatable arm 56 to the position as shown in FIG. 5B. Thus, the arm 50 is pulled by the transverse arm 53 and is rotated about the axis of the pinch roll 13b and is brought into the tilting position shown in FIG. 5B. As a result, the guide plates 15a, 15b and the lower pinch rolls 14a, 14b are out of the path followed by the phosphor sheet S". Thus, after passing through the upper pinch rolls 13a, 13b the phosphor sheet S" falls onto the support board. At this time, the guide plate 15b is brought into abutment with the support screw 59 and therefore it is impossible for the guide plates to rotate about the pin 52 so that there is no danger of the upper parts of the guide plates coming into the path followed by the phosphor sheet S". The height of the upper pinch rolls 13a, 13b is selected so that the falling distance of the sheets S will be small enough to prevent the sheets from bouncing on the support board.

The guide plate displacing mechanism is actuated only by a single solenoid "SOL" so that the likelihood of a malfunction is almost nil. It should be noted that an electric, hydraulic or pneumatic motor may be used in place of the solenoid. Also, it is possible to provide three or more pairs of pinch rolls to handle phosphor sheets of three or more different sizes.

The sheet feeding apparatus according to the second embodiment is so constructed that after a plurality of phosphor sheets S are stacked on the first inclined board 8, one of the three support boards brings the stack of phosphor sheets to the second inclined board 9. By simple modification of sequence it is possible cause the support boards to advance from the sheet receiving station to the sheet delivery station in response to the supply thereto of a single phosphor sheet, provided that the preceding support board at the sheet delivering station carries no phosphor sheet thereon. In this mode of operation when the first phosphor sheet S1 is supplied onto the support board at the sheet receiving station and when no phosphor sheets remain on the support board at the sheet delivering station, the support board brings the first phosphor sheet S1 to the sheet delivering station immediately. The first phosphor sheet S1 is then picked up by the suction pads 20 actuated, for instance, in response to a control signal from the X-ray image read-out apparatus. After the first sheet S1 has left the sheet delivering station, the second sheet S2 comes to the sheet receiving station, and then the support board bearing the second sheet S2 brings the second sheet S2 to the sheet delivering station immediately. The third, fourth and subsequent sheets are brought one by one from the sheet receiving station to the sheet delivering station so far as the rate at which the sheets are supplied to the sheet receiving station is no faster than the rate at which the sheets are discharged from the sheet delivering station. Otherwise, if the sheet supplying rate is greater than the sheet delivering rate, an increasingly large number of phosphor sheets will accumulate at the sheet receiving station before all the sheets are discharged from the delivering station. Consequently, the apparatus will bring phosphor sheets stack by stack to the sheet delivering station so that the apparatus works with the maximum possible efficiency.

The above embodiments were described as being used for transfering phosphor sheets from an X-ray image pick-up apparatus to an X-ray image read-out apparatus, but it should be noted that this is not a limitative application. The number of support boards is not limited to three, but two or four or more support boards can be used. In place of the chain drive, a belt-and-drum, a link movement or any other drive means convenient for the particular application at hand can be used for driving the support boards. The support boards can be moved upward from the sheet receiving station to the sheet delivering station if the latter station is at a higher level, or the support boards can be moved horizontally from the sheet receiving station to the sheet delivering station if both stations are on the same level.

Means for bending the sheets to eliminate any curl therein can be provided in the sheet feeding apparatus at the sheet receiving station, at the sheet delivering station or at any other part of the apparatus. Uncurling is effective for preventing jamming of sheets in their path of travel, for facilitating the stacking of the sheets in good alignment and for preventing the sheets from undesirably sticking to each other. In the embodiment as described above the suction pads 20 pick up and lower the sheets to the sheet delivering unit. The embodiment, however, can be so modified that the suction pads 20 pick up and raise (or laterally transfer) the sheets, depending on the location of the sheet delivering unit.

As is apparent from the above, the sheet material feeding apparatus according to this invention is simple in structure. There is little or no possibility of jamming of the sheets in their path of travel, and many sheets of different sizes can be handled at the same time. There is little or no danger of the surfaces of the sheets being scratched and there is little or no possibility of a sheet being accompanied by an undesired sheet.

I claim:

1. A sheet material feeding apparatus for bringing a plurality of sheets from a receiving station to a delivering station, said plurality of sheets being supplied to said receiving station at regular or irregular intervals and being delivered one by one from said delivering station, comprising:
   at least one support board for supporting a plurality of sheets in substantially upright condition at said receiving station;
   a first inclined board at said receiving station for supporting the plurality of sheets as tilted from the vertical in the order of supply with the supplied sheet at the bottom;
   a second inclined board at said delivering station for supporting the plurality of sheets as tilted from the vertical with the order of the sheets being upside down from that on the first inclined board; and
   means for moving said support board so as to follow a circulatory path starting from and returning to said receiving station via said delivering station.

2. A sheet material feeding apparatus according to claim 1, wherein the number of said support board is one and wherein said second inclined board has a sheet support formed as an extension projecting from the bottom end thereof, said single support board being adapted to pass by said sheet support extension to leave said plurality of sheets on said sheet support and said second inclined board.

3. A sheet material feeding apparatus according to claim 1 wherein the number of said support boards is two or more and wherein said apparatus further comprises an inclination switching means for inclining the support board towards said first inclined board on arrival at said receiving station and for inclining the support board towards said second inclined board on arrival at said delivering station.

* * * * *